3,022,192
PROCESS FOR IMPROVING THE ADHESION OF FLAT-SHAPED BODIES MADE OF POLY-TEREPHTHALIC ACID GLYCOL ESTERS
Wilhelm Brandt, Wiesbaden-Biebrich, Germany, assignor to Kalle Aktiengesellschaft, Wiesbaden-Biebrich, Germany
No Drawing. Filed Feb. 25, 1959, Ser. No. 795,321
Claims priority, application Germany Feb. 26, 1958
16 Claims. (Cl. 117—47)

This invention relates to new and useful improvements in the manufacture of flat-shaped bodies of polyterephthalic acid glycol esters, as films or sheets. More especially it is an object of this invention to provide a flat-shaped body of poly-terephthalic acid glycol esters with a surface of a better adhesion towards the surface of another article.

The principal object of this invention is to produce a biaxially stretched and heat-set film of poly-terephthalic acid glycol esters which fairly strongly adheres to coatings or sheetings of synthetic or natural material.

The adhesion of sheetings of poly-terephthalic acid glycol esters to the surfaces of shaped bodies made of the same or other material is very poor. It has already been suggested to improve their adhesive power towards coatings of high molecular synthetic or natural substances applied to them in the form of solutions or melts by subjecting the sheetings, prior to the coating operation, to the influence of liquids which have a swelling or dissolving effect on poly-terephthalic acid glycol esters, such as trichloro acetic acid. However, the improvement thus achieved of the adhesion of poly-terephthalic acid glycol ester films, e.g., to layers of polyethylene, polyvinyl alcohol or gelatine, is unsatisfactory.

Another disadvantage of this treatment with trichloro acetic acid solutions is that, in order to achieve a noticeably improved adhesion, it is very often necessary to apply solutions containing 10% or even more of trichloro acetic acid.

Now it has been found that the adhesion of shaped bodies of poly-terephthalic acid glycol esters, especially their adhesion to other high molecular synthetic or natural substances, can be considerably improved by adding chromic acid to the trichloro acetic acid solutions hitherto used for treating the shaped bodies of poly-terephthalic acid glycol esters.

In the following, the invention is described with reference to films of poly-terephthalic acid glycol esters, but it is to be understood that it can analogously be applied also to other shaped bodies of poly-terephthalic acid glycol esters, such as plates, tubes, pipes and fabrics.

Solutions containing trichloro acetic acid and chromic acid dissolved in water are preferably used for treating the shaped bodies as provided by the invention. For instance, the film to be treated is bathed at room temperature for a short time, i.e. about 30 to 60 seconds, in such an aqueous solution and then dried, preferably at temperatures of 120 to 130° C. Advantageously, surface-active agents, such as sulfonates of alcohols, are added to the aqueous solutions to enhance their moistening effect and to help them run off the film. Moreover, such addition of surface-active agents in some instances causes a further improvement of the adhesion. The bath may have an elevated temperature. If only water is used as the solvent of the trichloro acetic acid, the highest improvement of the adhesion is generally obtained and the lowest percentage of trichloro acetic acid and chromic acid are sufficient to accomplish a desired improvement.

Alternatively, the poly-terephthalic acid glycol ester films may be treated in accordance with the process of the present invention with trichloro acetic acid solutions to which chromic acid has been added and the solvent of which consists mainly of liquids other than water, e.g. of aromatic hydrocarbons in combination with some water to cause the chromic acid to dissolve and with alcohol to help the hydrocarbon and water to mix with each other. From the green color of such alcohol containing solutions it can be assumed that the added chromic acid is then present in a reduced form.

Trichloro acetic acid solutions to which chromic anhydride has been added, or a salt of chromic acid or of a polychromic acid which is soluble in aqueous trichloro acetic acid solution, viz. alkali metal chromate or alkali metal bichromate, are equivalent, as far as the present invention is concerned, to trichloro acetic acid solutions to which chromic acid has been added.

By a further modification of the process according to the present invention the adhesion of poly-terephthalic acid glycol ester films may be improved by a treatment with a trichloro acetic acid solution in a solvent mixture which comprises water and one or more organic solvents, to which solution a water-soluble chromium salt has been added. Whereas in the before-mentioned salts of chromic acid or polychromic acids chromium is contained in the anion, the term "chromium salt" used just now is to be understood to refer in the present application to salts in which the chromium occurs as a cation. Suitable solvents to be used in the last-mentioned modification of the present invention are, e.g., solvent mixtures consisting mainly of one or more aromatic hydrocarbons, to which water and alcohol have been added. A treatment of poly-terephthalic acid glycol ester films with such a trichloro acetic acid solution containing a water-soluble chromium salt leads to a considerable improvement of their adhesion. Frequently, a light clouding of the films remains after such treatment, which, however, can be disregarded in most cases.

Successive treatment of the poly-terephthalic acid glycol ester films first with a trichloro acetic acid solution and then with a chromic acid solution, or vice versa, is a further modification of the process according to the present invention, and in some cases this modification leads also to a considerable improvement of the adhesion of the films.

The process according to the present invention distinguishes itself in that in numerous cases it leads to a hitherto unparalleled improvement of the adhesion of the films. As a further advantage, only relatively small amounts of treating agents are required. Thus, if water is the only solvent used, concentrations of less than 5% by weight of trichloro acetic acid and less than 0.5% by weight of chromic acid (calculated as chromic anhydride) are sufficient to achieve an improvement of the adhesion which by far exceeds that obtained by a treatment with trichloro acetic acid solutions alone or with chromic acid solutions alone, even of much higher concentrations. As the percentage of the chromic acid used in the process of the present invention is very low, no noticeable discoloration of the sheet takes place. Further, it is of importance that, especially if purely aqueous solutions are used, the adhesion of the poly-terephthalic acid glycol ester sheets is highly improved even towards sheets consisting of hydrophilic substances, such as gelatin and polyvinyl alcohol.

*Examples*

(1) A poly-terephthalic acid glycol ester film of 0.050 mm. thickness, which had been biaxially stretched and dimensionally stabilized by a heat-treatment, is bathed for a short time, e.g. 30 seconds, and at room temperature in a solution made of 100 parts by weight of water, 3.5 parts by weight of trichloro acetic acid, 0.175 part by weight of chromic anhydride, and 0.4 part by weight of a commercial wetting agent consisting essentially of sulfonates of alcohols, and then dried at elevated temperature. The thus treated film is then combined with a plasticized polyvinyl butyral film by pressing both films together while keeping them at elevated temperature. The thus combined two films cannot be separated from each other without damaging them.

The same result is obtained if the pre-treated polyterephthalic acid glycol ester film is heat-pressed to a polyethylene film.

(2) A biaxially stretched and heat-set poly-terephthalic acid glycol ester film of 0.050 mm. thickness is bathed for a short time in a solution made of 100 parts by weight of water, 2.5 parts by weight of trichloro acetic acid, 0.05 part by weight of chromic anhydride, and 0.4 part by weight of the wetting agent used in Example 1, and then heat-dried. Onto this film there is coated first an intermediate layer of 0.005 mm. thickness consisting to equal parts by weight of glycerine and gelatin, and then, after a short drying process, a layer of 0.040 mm. thickness which consists of 15 parts by weight of glycerine and 100 parts by weight of gelatin.

After drying, the gelatin layer can no longer be separated from the poly-terephthalic acid glycol ester film. No decrease of the adhesion is to be observed when the gelatin-poly-terephthalic acid ester compound film is put into photographic developing or fixation fluids or into water and kept there for some time.

(3) A poly-terephthalic acid ester film which had been pre-treated as described in Example 1 and then dried is used for coating thereon a 20% (by weight) solution of a polyvinyl alcohol having a K-value of 75 and containing 98% of free hydroxyl groups. After drying, the polyvinyl alcohol layer formed on the poly-terephthalic acid ester film cannot be separated from its base.

(4) Biaxially stretched and heat-set poly-terephthalic acid glycol ester sheets of 0.050 mm. thickness are treated as described in Example 1 with an aqueous solution to which 2.5% by weight of trichloro acetic acid and 0.05% by weight of chromic anhydride have been added, and dried. Thereafter, the following layers are applied:

(a) A polyvinyl alcohol layer as described in Example 3;
(b) A gelatin layer as described in Example 2, with the modification that per 30 gs. of gelatin 0.01 g. of a wetting agent is added consisting essentially of sulfonates of alcohols, and that the gelatin layer is made up of 85 parts by weight of gelatin and 15 parts by weight of glycerine;
(c) A plasticized polyvinyl butyral film similar to that described in Example 1;
(d) A polyethylene film as described in Example 1;
(e) A film made up of a mixed condensate, consisting of 60 parts by weight of hexamethylene diamine and 40 parts by weight of caprolactam, analogously to the procedure described in Example 1.

In cases (a) to (d), no separation of the poly-terephthalic acid glycol ester sheet from the layer applied thereto was possible. In case (e), a tractive force of 400 to 500 g's (measured by means of a dynamometer) was required to separate a strip of 10 mm. width.

(5) To a solution consisting of 850 gs. of toluene and 150 gs. of trichloro acetic acid there are added a solution of 10 gs. of chromic anhydride in 10 gs. of water and also 50 ml. of alcohol. After vigorously shaking for 10 minutes, a single-phase green solution is obtained. A biaxially stretched and heat-set poly-terephthalic acid glycol ester film of 0.050 mm. thickness is bathed for a short time in this solution at room temperature and then dried by the application of heat. The dried film is almost colorless and does not feel sticky. Onto this film, a polyethylene film having a thickness of 0.040 mm. is pressed and then heated so that it melts for a short time.

A tractive force of 700 to 800 g's (measured by means of a dynamometer) was necessary to separate the polyethylene layer from the poly-terephthalic acid ester film in a test in which a strip of 10 mm. width was used. The compound film is sealable by heat on its polyethylene side.

(6) A biaxially stretched and heat-set poly-terephthalic acid glycol ester film is bathed as described in Example 5 in a solution made of 850 gs. of toluene, 150 gs. of trichloroacetic acid, 8 gs. of water, 7.5 gs. of chromic nitrate, and 70 ml. of alcohol, then dried and provided with a polyethylene coating. The polyethylene coating cannot be detached from the base, even when the compound film has been submersed in water for several days.

(7) A biaxially stretched, heat-set poly-terephthalic acid glycol ester film is bathed as described in Example 5 in a solution containing 850 gs. of toluene, 150 gs. of trichloro acetic acid, 8 gs. of water, 7.5 gs. of chromic chloride, and 50 ml. of alcohol, and then dried. Onto this film there is pressed, under the influence of heat, a 0.400 mm. thick extruded film of plasticized polyvinyl butyral. In a test similar to the one described in Example 5, the adhesion of the plasticized polyvinyl butyral film to the polyester film corresponds to a value of 1500 to 1750 g's.

(8) A biaxially stretched and heat-set poly-terephthalic acid glycol ester film is bathed first in a 2.5% by weight trichloro acetic acid solution, to which 0.2% by weight of a surface-active agent had been added, and then in a 0.5% by weight aqueous solution of chromic acid (the content of chromic acid being calculated as chromium trioxide), to which the same quantity of the surface-active agent had been added, the bath in both instances being very short, and then dried for 1 minute in a drying oven heated to 120° C. The thus treated film is then coated with a 20% by weight solution of a plasticized polyvinyl butyral in methanol. After evaporation of the methanol a polyvinyl butyral layer having a thickness of 0.200 mm. is formed. If measured as described in Example 5, the adhesion of this layer to the poly-terephthalic acid glycol ester film corresponds to 300 to 350 g's.

If an intermediate drying process is inserted between the two treatments with the aqueous baths by putting the film for 1 minute into a drying oven heated to 120° C., the adhesion finally corresponds to 350 to 400 g's.

If the two baths follow each other in the reverse order an adhesion of 100 to 150 g's is obtained which can be raised to a value of 250 to 300 g's by applying the intermediate drying process just mentioned.

(9) A fabric made of poly-terephthalic acid glycol ester yarn is bathed for 10 seconds in a solution comprising 100 parts by weight of water, 2.5 parts by weight of trichloro acetic acid, 0.25 part by weight of chromium trioxide, and 0.2 part by weight of the before-mentioned wetting agent, and then dried in a drying oven. The dried fabric is then combined with a polyamide film by pressing them both together under the influence of heat. The polyamide making up the film is a mixed condensate of ξ-caprolactam, adipic hexamethylene diamine and adipic diamino-dicyclohexylmethane, containing 35 parts by weight of a plasticizer per 100 parts by weight of polyamide. A tractive force of 1200 to 1400 g's (measured by means of a dynamometer) is required to separate the fabric from the film at a strip of 10 mm. width.

What I claim is:

1. A process for increasing the ability of a sheet of polyterephthalic acid glycol ester to adhere to films of another high-molecular film-forming organic material which comprises treating the surface of said sheet with an aqueous solution of trichloroacetic acid and a chromium compound of the group consisting of chromic acid, a water-soluble salt of chromic acid, a water-soluble salt of a polychromic acid, and a water-soluble salt in which the chromium is in the cation, and where said chromium compound is a water-soluble chromium salt in which the chromium is in the cation the solvent is essentially toluene containing 8 to 10 parts of water by weight for every 850 parts of toluene along with sufficient alcohol to render the toluene and water miscible; and drying said sheet to form a surface thereon which contains the applied chromium compound and free trichloroacetic acid.

2. The process of claim 1 wherein the trichloroacetic acid and the chromium compound are dissolved together in a common treating solution.

3. The process of claim 1 wherein the chromium compound is a member of the group consisting of chromic acid, a water-soluble salt of chromic acid, and a water-soluble salt of polychromic acid; and the chromium compound and the trichloroacetic acid are dissolved in water as the sole solvent.

4. The process of claim 1 wherein the sheet is a biaxially stretched, heat-set film.

5. A process for making a composite sheet comprising a biaxially stretched and heat-set film of polyterephthalic acid glycol ester and a film of another high-molecular, film-forming, organic material, in which process a surface of said first-named film is interacted with an aqueous solution of trichloroacetic acid and a chromium compound of the group consisting of chromic acid, water-soluble salt of chromic acid, water-soluble salt of a polychromic acid, and water-soluble chromium salt in which the chromium is in the cation, and where said chromium compound is a water-soluble chromium salt in which the chromium is in the cation the solvent consists essentially of toluene containing 8 to 10 parts of water by weight for every 850 parts of toluene along with sufficient alcohol to render the toluene and water miscible; drying said surface, and then adhering said second-named film to said dried surface.

6. The process of claim 5 wherein the second-named film is formed on and combined with the interacted and dried polyterephthalic acid glycol ester surface by applying a solution of the other high-molecular, film-forming, organic material and thereafter removing the solvent from the applied solution.

7. The process of claim 5 wherein the second-named film is thermoplastic and is applied to the interacted and dried surface of the polyterephthalic acid glycol ester film by heating the two films and pressing them together.

8. The process of claim 6 wherein the second-named film is formed from a solution of gelatine.

9. The process of claim 6 wherein the second-named film is formed from a solution of polyvinyl alcohol.

10. The process of claim 7 wherein the second-named film is polyethylene.

11. The process of claim 7 wherein the second-named film is a polyamide.

12. A biaxially stretched, heat-set film of polyterephthalic acid glycol ester wherein the surface layer contains free trichloroacetic acid and a chromium compound of the group consisting of chromic acid, a water-soluble salt of chromic acid, a water-soluble salt of a polychromic acid, and a water-soluble chromium salt in which the chromium is in the cation, the trichloroacetic acid being present in major amount with respect to said chromium compound.

13. A composite sheet comprising a biaxially stretched, heat-set film of polyterephthalic acid glycol ester and a film of another high-molecular, film-forming, organic material, in which composite sheet the polyterephthalic acid glycol ester surface which contacts the second-named film contains free trichloroacetic acid and a chromium compound of the group consisting of chromic acid, a water-soluble salt of chromic acid, a water-soluble salt of a polychromic acid, and a water-soluble chromium salt in which the chromium is in the cation, the trichloroacetic acid being present in major amount with respect to said chromium compound.

14. A process for increasing the ability of a sheet of polyterephthalic acid glycol ester to adhere to films of another high molecular film-forming organic material, which process comprises: (1) treating the surface of said sheet with an aqueous solution of trichloroacetic acid and a chromium compound selected from the group consisting of chromic acid, water-soluble salts of chromic acid, and water-soluble salts of polychromic acids, and (2) drying the treated sheet.

15. Process of claim 14 wherein said chromium compound is chromic acid.

16. A process for increasing the ability of a sheet of polyterephthalic acid glycol ester to adhere to films of another high molecular film-forming organic material, which process comprises: (1) treating the surface of said sheet with a solution of trichloroacetic acid and a water-soluble chromium salt in which the chromium is in the cation, the solution being essentially in toluene containing 8–10 parts of water by weight for every 850 parts of toluene by weight along with sufficient alcohol to render the toluene and water miscible; and (2) drying said sheet.

References Cited in the file of this patent

UNITED STATES PATENTS

| | | |
|---|---|---|
| 2,647,836 | Patten | Aug. 4, 1953 |
| 2,824,019 | Sapper | Feb. 18, 1958 |
| 2,886,471 | Bruce et al. | May 12, 1959 |
| 2,893,896 | Beeber et al. | July 7, 1959 |